Patented May 9, 1950

2,507,070

UNITED STATES PATENT OFFICE 2,507,070

STABILIZED BITUMINOUS COMPOSITIONS

George H. von Fuchs, Wood River, and Norman B. Wilson, Alton, Ill., assignors to Shell Development Company, San Francisco, Calif., a corporation of Delaware No Drawing. Application December 19, 1947, Serial No. 792,864

7 Claims. (Cl. 106—273)

This invention deals with the preparation of improved bituminous compositions and more particularly is concerned with the prevention of hardening of asphalts, thereby improving their useful life.

The hardening of bituminous substances appears to be caused by one or both of two important phenomena, namely oxidation and polymerization. Although hardening has not been fully investigated from a chemical standpoint, it appears that oxidation proceeds through the formation of peroxides, which in turn catalyze the polymerization of constituents of the bitumens, causing them to be resinified and hardened. The degree of hardness of a bituminous substance, such as asphalt, is rapidly determined by the well known penetration test wherein a weighted needle is allowed to penetrate the surface of an asphalt for a given length of time at a standard temperature. The extent of the penetration is an indication of the degree of hardness of the asphalt being tested.

The practical significance of the hardening of asphalts is evident wherever asphalt compositions are employed for such purposes as roads, paving, roofing or paints. If the asphalt becomes hardened the composition fractures and aggregate mixed therewith separates from the asphalt binder thus causing disintegration of the paving. If asphalt paints or roofing materials become hardened, this is often evidenced by chipping or cracking.

Numerous stabilizers and anti-oxidants have been added to bituminous substances for one purpose or another, such as to prevent the discolorization of roofing granules. While some of these materials are suitable for the prevention of discolorization of such granules, many of them have little or no effect upon retarding the hardening of asphalts, especially those subjected to heating prior to being employed in paving compositions. The familiar type of organic stabilizers, such as polyhydroxy phenols and aromatic amines, fall within this category. Typical members of these groups are alpha-naphthylamine, para-phenylene diamine, alkylated phenols and hydroquinone.

It is an object of this invention to improve bituminous compositions. It is another object of this invention to prevent the oxidation and polymerization of bituminous compositions. It is a third object of this invention to prolong the life of asphalt compositions. It is a further object of this invention to prevent the hardening of asphalt compositions. Other objects will become apparent during the following discussion.

Now, in accordance with this invention, it has been found that the addition of oxides of selenium or tellurium to bituminous materials substantially diminishes their rate of hardening.

The oxides of selenium and tellurium, which are metals of the right hand sub-group of group VI of the periodic table having atomic weights of between 78 and 128, are useful in the present invention since they prevent the hardening of asphalt and at the same time do not vaporize at the temperatures at which asphalts are usually handled or treated. Natural or synthetic products containing these compounds may be employed for the stabilization of bituminous materials as long as they contain an appreciable quantity of the stabilizers. A typical industrial by-product of this kind is the sludge residue obtained during the electrolytic refining of copper which is a desirable and inexpensive source of selenium and tellurium compounds.

The amounts of selenium or tellurium oxides to be incorporated in the bituminous composition will depend upon the identity of the compound and upon the purpose for which the bituminous composition is to be used. Generally speaking, rather minor amounts of the oxides will produce the desired result. Ordinarily, amounts from about 0.1 to about 2.0%, based on the weight of the bituminous substance, effectively reduces the rate of hardening of the bitumen. Under ordinary circumstances, where paving is made with asphalts having 85–120 penetration, from 0.1 to 1% of the selenium or tellurium oxide suffices to stabilize the composition against undue hardening.

The stabilizers may be incorporated in the bituminous materials by well known and convenient means, such as stirring while the bituminous material is hot and in a fluid state, at which time the compound may be added in solid form or as a solution or even in some cases incorporated in a gaseous state. Incorporation of a concentrated solution of the selenium oxide or of finely divided solid together with rapid stirring are preferred means of imparting stability to the bituminous material.

While pyrogenous asphalts are the preferred type of bituminous substances for use in the compositions of the present invention, other bituminous substances are benefited to a greater or less degree. For example, blown asphalts appear to be benefited by these additions even to a greater extent than steam reduced asphalts or vacuum prepared asphalts. Other bituminous substances which may be benefited include the natural waxes such as Montan wax; the natural asphalts such as Trinidad asphalt; asphaltites such as Gilsonite; pyrogenous distillates and their residues; coal tars such as low temperature coal tar; wood tars such as pine tar and other natural tars such as lignite tar as well as the various pitches. The bituminous compositions containing preferably asphalt and stabilized by the presence of one of the above additives may contain other ingredients such as sand, mineral aggregates, pigments, adhesion agents or emulsifying agents and if the composition is to be decomposed in the form of an emulsion it may contain water in either a dispersed or continuous phase.

It will be evident that the compositions having improved resistance to hardening have a practical importance in increasing the durability of roads and airports as well as improving the strength of building materials such as bricks and preventing the chipping of water-proofing asphalt compositions such as roofing, siding, etc. Other uses will be apparent to those expert in the art. The following examples illustrate specific embodiments of the invention.

Example I

Three asphalts of 85–100 penetration grade were used in the following experiments: Asphalt A was obtained from a Mid-Continent crude; asphalt B was a vacuum flashed blend of equal parts of West Texas and Kansas crude residues; and asphalt C was obtained from Venezuelan crude.

The penetration of each sample was determined at 77° F., with a 100 g. load on the needle for 5 seconds. The resistance to hardening was tested as follows: 1880 g. of standard Ottawa sand at 400° F. and 120 g. asphalt at 300° F. were mixed in a pug mill at 275–300° F. for 1 minute. The mix was held at 350° F. for 30 minutes and was then spread and allowed to cool to room temperature. The asphalt was extracted with benzene from which it was subsequently recovered and retested for penetration.

As indicated by the table below, unmodified samples of the asphalts were treated by the above procedure and other samples were improved by the addition of various amounts of selenium dioxide. The resistance to hardening is indicated by an increase in the "per cent of original penetration," which is the ratio of the final penetration to the original penetration.

|  | Per cent original penetration |
|---|---|
| A. Mid-Continent asphalt: | |
| No additive | 48.4 |
| 0.1% selenium dioxide | 73.4 |
| 1.0% selenium dioxide | 92.4 |
| B. 50–50 West Texas-Kansas asphalt: | |
| No additive | 52.2 |
| 0.2% selenium dioxide | 67.0 |
| 1.0% selenium dioxide | 80.0 |
| C. Venezuelan asphalt: | |
| No additive | 50.0 |
| 0.2% selenium dioxide | 62.0 |
| 1.0% selenium dioxide | 81.3 |

Example II

When the Mid-Continent asphalt A, used in Example I, is modified by the addition of 0.5% tellurium dioxide and tested by the method described in Example I, the modified asphalt will have an improved resistance to hardening.

We claim as our invention:

1. A bituminous composition having improved hardening resistance comprising asphalt containing at least $\frac{1}{10}$% by weight based on the asphalt of an oxide of the group consisting of selenium oxide and tellurium oxide, the amount of said oxide being sufficient to improve the hardening resistance of said composition.

2. A bituminous composition having improved hardening resistance comprising asphalt containing from about 0.1% to about 2.0% by weight based on the asphalt of an oxide of the group consisting of selenium oxide and tellurium oxide.

3. A bituminous composition having improved hardening resistance comprising asphalt containing from about 0.1% to about 1.0% by weight based on the asphalt of an oxide of the group consisting of selenium oxide and tellurium oxide.

4. A bituminous composition having improved hardening resistance consisting essentially of asphalt containing from about 0.1% to about 1% by weight of an oxide of the group consisting of selenium oxide and tellurium oxide.

5. An asphalt paving composition having improved resistance toward hardening comprising an aggregate bound with an asphalt binder, said binder containing from about 0.1% to about 2.0% by weight based on the asphalt of selenium dioxide.

6. An asphalt composition having improved resistance towards hardening comprising an asphalt, an aggregate and from about 0.1% to about 2.0% by weight of the asphalt, of selenium dioxide.

7. An asphalt composition having improved resistance towards hardening comprising an asphalt containing from about 0.1% to about 2.0% by weight based on the asphalt of selenium dioxide.

GEORGE H. von FUCHS.
NORMAN B. WILSON.

REFERENCES CITED

The following references are of record in the file of this patent:

UNITED STATES PATENTS

| Number | Name | Date |
|---|---|---|
| 1,372,467 | Willis | Mar. 22, 1921 |
| 1,505,880 | Fairlie | Aug. 19, 1924 |